(12) United States Patent
Falodiya

(10) Patent No.: US 8,856,778 B2
(45) Date of Patent: *Oct. 7, 2014

(54) SOFTWARE SELECTION BASED ON AVAILABLE STORAGE SPACE

(75) Inventor: Aditya Falodiya, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 12/431,971

(22) Filed: Apr. 29, 2009

(65) Prior Publication Data

US 2014/0033195 A1    Jan. 30, 2014

(51) Int. Cl.
*G06F 9/445* (2006.01)

(52) U.S. Cl.
CPC .... *G06F 8/61* (2013.01); *G06F 8/60* (2013.01)
USPC ............................ 717/175; 717/177; 717/169

(58) Field of Classification Search
CPC .............. G06F 8/61; G06F 8/65; G06F 8/60; G06F 11/1433
USPC .................................................. 717/168–178
See application file for complete search history.

(56) References Cited

U.S. PATENT DOCUMENTS

| | | | | |
|---|---|---|---|---|
| 6,131,192 | A * | 10/2000 | Henry ........................... | 717/175 |
| 6,279,154 | B1 * | 8/2001 | Davis ........................... | 717/174 |
| 6,314,565 | B1 * | 11/2001 | Kenner et al. ................. | 717/171 |
| 6,378,128 | B1 * | 4/2002 | Edelstein et al. ............. | 717/174 |
| 6,601,236 | B1 * | 7/2003 | Curtis ........................... | 717/177 |
| 6,744,450 | B1 * | 6/2004 | Zimniewicz et al. ......... | 715/841 |
| 6,986,135 | B2 | 1/2006 | Leathers et al. | |
| 6,996,815 | B2 | 2/2006 | Bourke-Dunphy et al. | |
| 7,036,121 | B1 * | 4/2006 | Casabona et al. ............. | 717/173 |
| 7,058,942 | B2 | 6/2006 | Bourke-Dunphy et al. | |
| 7,228,541 | B2 | 6/2007 | Gupton et al. | |
| 7,735,078 | B1 * | 6/2010 | Vaidya ........................... | 717/171 |
| 7,779,404 | B2 * | 8/2010 | Movassaghi et al. .......... | 717/171 |
| 2001/0056572 | A1 * | 12/2001 | Richard et al. ................. | 717/11 |
| 2002/0046216 | A1 * | 4/2002 | Yamazaki et al. ............. | 707/201 |
| 2002/0147974 | A1 * | 10/2002 | Wookey ........................ | 717/176 |
| 2004/0169687 | A1 | 9/2004 | Zimniewicz et al. | |
| 2004/0255291 | A1 | 12/2004 | Sierer et al. | |
| 2006/0174086 | A1 * | 8/2006 | Filgate et al. .................. | 711/171 |
| 2008/0134169 | A1 | 6/2008 | Williams et al. | |
| 2008/0189698 | A1 * | 8/2008 | Sareen et al. .................. | 717/174 |

OTHER PUBLICATIONS

"U.S. Appl. No. 12/431,967, Non Final Office Action mailed Oct. 4, 2012", 18 pgs.
"U.S. Appl. No. 12/431,967, Examiner Interview Summary mailed Dec. 31, 2012", 3 pgs.
"U.S. Appl. No. 12/431,967, Final Office Action mailed Mar. 26, 2013", 17 pgs.
"U.S. Appl. No. 12/431,967, Response filed Jan. 4, 2013 to Non-Final Office Action mailed Oct. 4, 2012", 18 pgs.
"U.S. Appl. No. 12/431,967, Examiner Interview Summary mailed May 3, 2013", 4 pgs.
"U.S. Appl. No. 12/431,967, Response filed Jun. 26, 2013 to Final Office Action mailed Mar. 26, 2013", 17 pgs.

* cited by examiner

*Primary Examiner* — Lewis A Bullock, Jr.
*Assistant Examiner* — Tina Huynh
(74) *Attorney, Agent, or Firm* — Shook, Hardy & Bacon L.L.P.

(57) ABSTRACT

Software selection based on available storage space involves determining that a data package (e.g., a software component) is not to be loaded (e.g., not to be installed) onto a storage device (e.g., a disk drive) of a computer (e.g., a target computer). This determination is based on the available storage capacity of the storage device (e.g., free disk space) and on a storage requirement of the optional data package (e.g., disk space required by the proposed software component). In some example embodiments, available storage capacity is determined automatically (e.g., by using an application programming interface).

24 Claims, 7 Drawing Sheets

SOFTWARE SELECTION BASED ON AVAILABLE STORAGE SPACE

TECHNICAL FIELD

The subject matter disclosed herein generally addresses methods and apparatus for selecting software to be loaded or installed onto a storage device of a target computer. Specifically, the present disclosure addresses such methods and apparatus involving selecting software based on available storage space of the storage device of the target computer.

BACKGROUND

Software installation programs, often referred to as "software installers," that load or install software onto a storage device of a computer are well-known. An example of a simple installer is an executable file containing a self-extracting archive of the software to be installed onto the storage device. An administrator of the computer, having decided to install the software onto the storage device, generally copies the executable file to the computer (e.g., to the storage device) and executes the file. During execution, the executable file extracts software components (e.g., files) from the archive and copies them to the storage device.

An example of a more sophisticated installer is one that presents the administrator with a user interface to select or deselect software for installation onto the storage device. A software installer may propose to the administrator a default set of software components selected for installation, and the administrator may use the user interface to modify that set prior to installation so that the modified set of software components is installed onto the storage device. This type of feature provides the administrator with some flexibility in allocating available storage capacity of the storage device.

BRIEF DESCRIPTION OF THE DRAWINGS

Some embodiments are illustrated by way of example and not limitation in the figures of the accompanying drawings in which.

DETAILED DESCRIPTION

Figure 1:
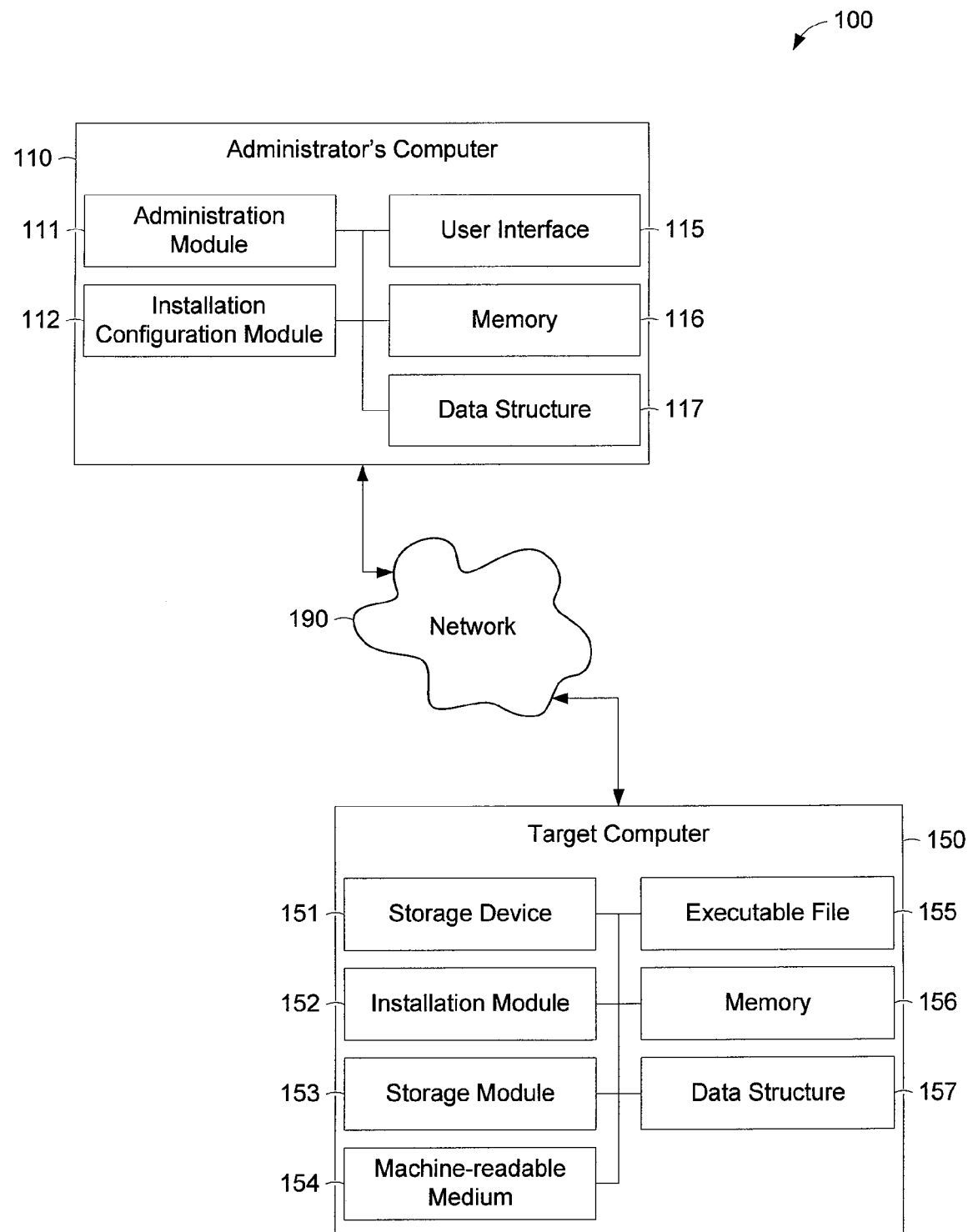
FIG. 1 is a block diagram illustrating components of a system, according to some example embodiments, to perform software selection based on available storage space.

Example methods and apparatus are directed to software selection based on available storage space. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To facilitate selection of software to be loaded or installed onto a storage device of a target computer, a user interface may allow an administrator to estimate the available storage space of the storage device. Based on this estimate, software to be loaded or installed is automatically selected or deselected so that the selected software does not exceed the available storage space. Fully automated versions may automatically access the available storage space (e.g., via an application programming interface (API)) before automatically selecting or deselecting software for installation.

Potential advantages include, but are not limited to, reducing the need for an administrator to select or deselect software to be loaded or installed onto a storage device of a target computer, assisting the administrator in deciding whether a particular piece of software is to be selected or deselected, and efficiently using human or machine resources by raising the likelihood that an entire set of selected software pieces may be successfully installed on the first attempt, without exceeding the available storage capacity of the storage device.

Software selection based on available storage space involves determining that, while one piece of software (e.g., a data package, or a software component) is selected to be loaded or installed onto a storage device (e.g., a disk drive) of a computer (e.g., a target computer), a second piece of software is not to be loaded or installed onto the storage device. This determination is made based on the available storage capacity of the storage device (e.g., free disk space) and on a storage requirement of the second piece of software. Available storage capacity, according to various example embodiments, may be estimated, accessed, received, determined, or any combination thereof. Available storage capacity may be estimated by an administrator (e.g., a user) and received via a user interface (e.g., a graphical window, or a data entry field). In some example embodiments, available storage capacity is determined automatically (e.g., by using an API call at the target computer). In certain example embodiments, available storage capacity is estimated by an administrator at a local computer (e.g., an administrator's computer) and revised by automatic determination at a remote computer (e.g., a target computer).

As used herein, "data package" refers to any packaged or bundled set of data loadable onto a storage device of a computer. For example, a data package may include system files, executable files, data files, libraries, media content, file system directories, metadata files, raw data, or any combination thereof. A data package is deemed as "mandatory" if the manufacturer or distributor of the data package has indicated that the data package is required or if software to be installed cannot operate without the data package. Where a data package is not deemed as mandatory but is nonetheless available for loading onto the storage device, the data package is deemed as "optional."

As used herein, "software component" refers to any data package that constitutes a component of a computer software program or of a suite of computer software programs (e.g., a software application). A software component is deemed as "required" if the manufacturer or distributor of the software program(s) has indicated that the software component is required or if the software program(s) cannot operate without the software component. Where a software component is not deemed as required but is nonetheless potentially advantageous to install, the software component is deemed as "proposed."

FIG. 1 is a block diagram illustrating components of a system 100, according to various example embodiments, to perform software selection based on available storage space. According to many example embodiments, an administrator's computer 110 is connected to a network 190, which is connected to a target computer 150. Alternatively, many other example embodiments omit the administrator's computer 110, the network 190, or both.

The administrator's computer 110 is a computer used by an administrator (e.g., a user) to load or install software onto one or more remote computers (e.g., target computer 150) accessible via a network (e.g., network 190). The administrator's computer 110 is a computer system (e.g., FIG. 7, computer system 700) and may be a personal computer (PC).

Figure 5:
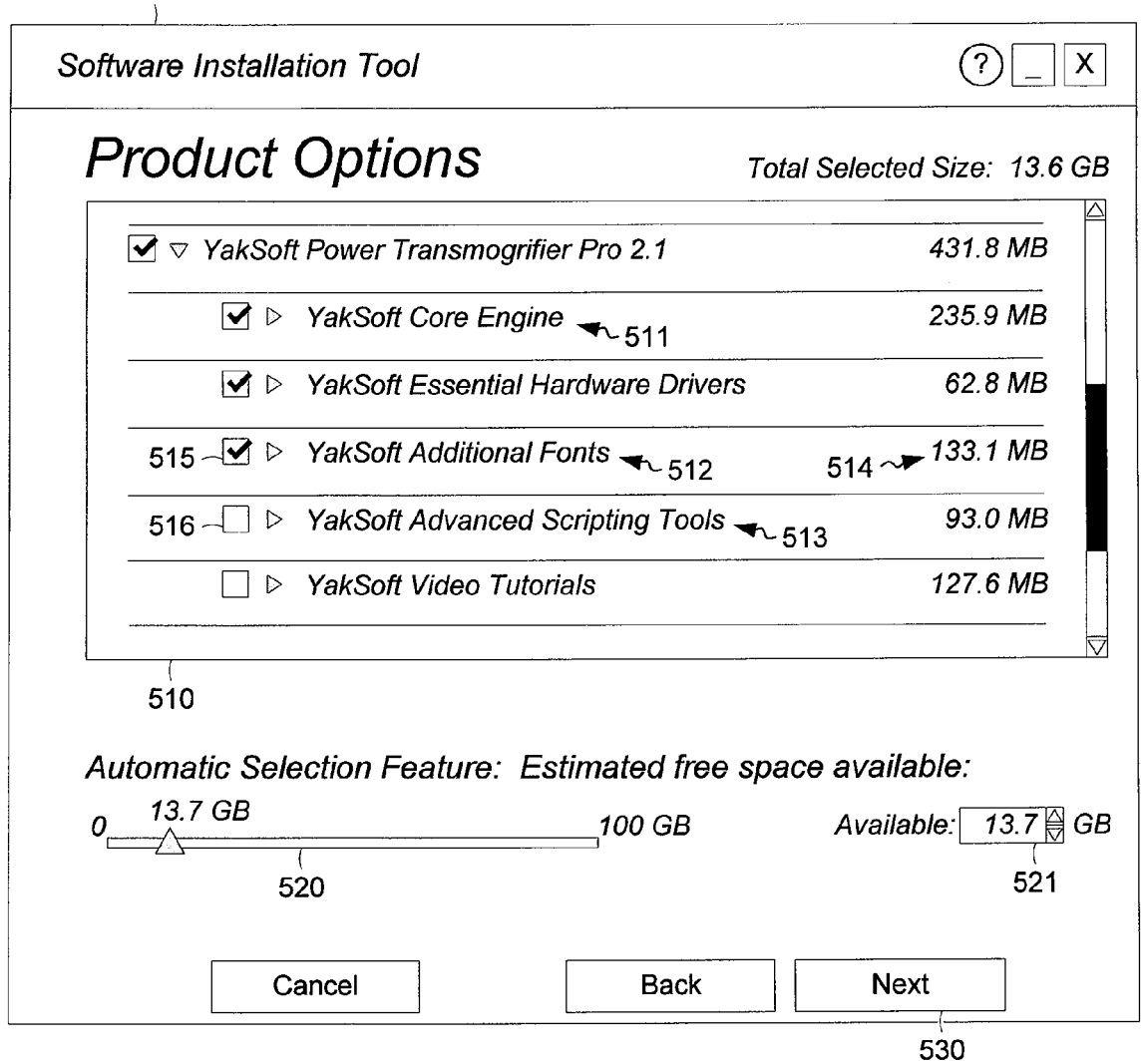
FIG. 5 is a diagram illustrating a user interface, according to some example embodiments, to facilitate software selection based on available storage space.

In example embodiments that include the administrator's computer 110, the administrator's computer 110 includes at least an administration module 111, an installation configuration module 112, and a user interface 115 (e.g., FIG. 5, window 500). The administrator's computer 110 may include a memory 116, a data structure 117, or any combination thereof.

The network 190 may be any network that communicatively connects two or more computers to each other (e.g., the administrator's computer 110 to the target computer 150). The network 190 may be a wired network, a wireless network, or any combination thereof, and may include one or more networks that are private or public (e.g., the Internet).

The target computer 150 is a computer system (e.g., FIG. 7, computer system 700) and may be a PC. The target computer 150 includes at least a storage device 151 (e.g., a disk drive). The storage device 151 has a finite storage capacity, at least a portion of which is available for storing data (e.g., free disk space). According to various example embodiments, the target computer 150 may include an installation module 152, a storage module 153, a machine-readable medium 154 (e.g., FIG. 7, machine-readable medium 722), an executable file 155, a memory 156, a data structure 157, or any combination thereof.

At the administrator's computer 110, the administration module 111 is implemented using hardware and receives an estimate of the available storage capacity of the storage device 151. The administration module 111 also presents a data set via user interface 115. The data set indicates at least a mandatory data package as selected for loading onto the storage device 151 and indicates an optional data package as not selected for loading onto the storage device 151. This has the effect of presenting to an administrator at least the mandatory data package as selected for loading onto the storage device 151 while presenting the optional data package as not selected for loading onto the storage device 151.

The installation configuration module 112 is implemented using hardware and accesses loading information at the administrator's computer 110. As used herein, "loading information" refers to information relevant in facilitating the loading of software (e.g., data packages, software components, storage requirements, files, dependencies, etc.). The loading information may be stored in a data structure (e.g., data structure 117, or FIG. 4, loading information 400). The loading information identifies the mandatory data package, the optional data package, and a storage requirement of the optional data package. The installation configuration module 112 also determines that the optional data package is not to be loaded onto the storage device 151. This determination is based on the estimate of the available storage capacity and on the storage requirement of the optional data package. Furthermore, this determination is performed at the administrator's computer 110. The installation configuration module 112 additionally generates the data set based on the determination. The installation configuration module 112 may also generate, based on the data set, one or more instructions to load at least the mandatory data package onto the storage device 151.

In some example embodiments, the optional data package is a first optional data package among multiple optional data packages. In some of these example embodiments, the installation configuration module 112 generates the data set indicating a second optional data package as selected for loading onto the storage device 151. This has the effect of selecting a particular optional data package for loading onto the storage device 151 while not selecting another optional data package for loading onto the storage device 151. The installation configuration module 112 may additionally generate, based on the data set, one or more instructions to load at least the second optional data package onto the storage device 151.

Where the optional data package is a first optional data package among multiple optional data packages, and where the installation configuration module 112 generates the data set indicating a second optional data package as selected for loading onto the storage device 151, the administration module 111 may receive, after the presenting of the data set, a revised data set via the user interface 115. The revised data set indicates a second optional data package as not selected for loading. This has the effect of allowing an administrator to override an automatic selection of a particular optional data package and indicate that it is not to be loaded onto the storage device 151. The installation configuration module 112 may additionally generate, based on the revised data set, one or more instructions to load at least the mandatory data package onto the storage device 151.

Where the optional data package is a first optional data package among multiple optional data packages, the storage requirement may be a first storage requirement. According to some example embodiments, the installation configuration module 112 identifies the first optional data package by determining that the first storage requirement is greater than a second storage requirement of a second optional data package among the multiple optional data packages. This has the effect of preferring smaller data packages in the selection of optional data packages to be loaded onto the storage device 151. Alternatively, in some example embodiments, the installation configuration module 112 identifies the first optional data package by determining that the first storage requirement is less than the second storage requirement. This has the effect of preferring larger data packages in the selection of optional data packages to be loaded onto the storage device 151.

In some example embodiments, the mandatory data package includes a required software component, the optional data package includes a proposed software component, and the installation configuration module 112 generates the data set indicating at least the required software component as selected for loading onto the storage device 151 and indicating the proposed software component as not selected for loading onto the storage device 151. This has the effect of presenting to the administrator at least the required software component as selected for loading onto the storage device 151 while presenting the proposed software component as not selected for loading onto the storage device 151.

The administration module 111 may receive an estimated value at a memory 116 of the administrator's computer 110. This reception occurs via a user interface 115. The estimated value represents the available storage capacity of the storage device 151 and may be provided by an administrator (e.g., a user). The administration module 111 also presents a data set via the user interface 115. The data set indicates at least a required software component as selected for loading onto the storage device 151 and indicates a proposed software component as not selected for loading onto the storage device 151. This has the effect of presenting to an administrator at least the required software component as selected for installation onto the storage device 151 while presenting the proposed software component as not selected for installation onto the storage device 151.

The installation configuration module 112 may read a data structure 117 (e.g., FIG. 4, loading information 400) at the administrator's computer 110. As used herein, "data structure" refers to a body of data organized for temporary or permanent storage on a machine-readable medium (e.g., a record of a database, or a file of a file system). For example, the data structure 117 may be an eXtensible Markup Language (XML) file. The data structure 117 identifies the required software component, the proposed software component, and a storage requirement of the proposed software component. The installation configuration module 112 also determines that the proposed software component is not to be installed onto the storage device 151. This determination is based on the estimated value and the storage requirement. Furthermore, this determination is performed at the administrator's computer 110. The installation configuration module 112 additionally generates the data set based on the determination. The installation configuration module 112 may also generate, based on the data set, one or more instructions to load at least the required software component onto the storage device 151.

In some example embodiments, the proposed software component is a first proposed software component among multiple proposed software components. In some of these example embodiments, the installation configuration module 112 generates the data set indicating a second proposed software component as selected for loading onto the storage device 151. This has the effect of selecting a particular proposed software component for installation onto storage device 151 while not selecting another proposed software component for installation onto the storage device 151. The installation configuration module 112 may additionally generate, based on the data set, one or more instructions to install at least the second proposed software component onto the storage device 151.

Where the proposed software component is a first proposed software component among multiple proposed software components, and where the installation configuration module 112 generates the data set indicating a second proposed software component as selected for installation onto the storage device 151, the administration module 111 may receive, after the presenting of the data set, a revised data set via the user interface 115. The revised data set indicates a second proposed software component as not selected for loading. This has the effect of allowing an administrator to override an automatic selection of a particular proposed software component and indicate that it is not to be installed onto the storage device 151. The installation configuration module 112 may additionally generate, based on the revised data set, one or more instructions to load at least the required software component onto the storage device 151.

Where the proposed software component is a first proposed software component among multiple proposed software components, the storage requirement may be a first storage requirement. According to some example embodiments, the installation configuration module 112 identifies the first proposed software component by determining that the first storage requirement is greater than a second storage requirement of a second proposed software component among the multiple proposed software components. This has the effect of preferring smaller software components in the selection of proposed software components to be loaded onto the storage device 151. Alternatively, in some example embodiments, the installation configuration module 112 identifies the first proposed software component by determining that the first storage requirement is less than the second storage requirement. This has the effect of preferring larger software components in the selection of proposed software components to be loaded onto the storage device 151.

At the target computer 150, the installation module 152 is implemented using hardware and accesses loading information also at the target computer 150. The loading information may be stored in a data structure (e.g., data structure 157). The loading information identifies a mandatory data package, an optional data package, and a storage requirement of the optional data package. The installation module 152 also determines that the optional data package is not to be loaded onto the storage device 151. This determination is based on a storage value representing available storage capacity of the storage device 151 and on the storage requirement of the optional data package. Furthermore, this determination is performed at target computer 150. The installation module 152 additionally generates, based on the determination, a data set indicating at least the mandatory data package as selected for loading onto the storage device 151 and not indicating the optional data package as selected for loading onto the storage device 151. The installation module 152 may also generate, based on the data set, one or more instructions to load at least the mandatory data package onto the storage device 151. According to some example embodiments, installation module 152 also determines the storage value. For example, the storage value may be determined by using one or more API calls (e.g., as provided by the operating system of the target computer 150).

The storage module 153 stores the data set on a machine-readable medium (e.g., machine-readable medium 154). For example, the storage module 153 may write the data set to a memory 156 of the target computer 150. As another example, the storage module 153 may copy the data set to a machine-readable medium 154 of the target computer 150.

In some example embodiments, the optional data package is a first optional data package among multiple optional data packages. In some of these example embodiments, the installation module 152 generates the data set indicating a second optional data package as selected for loading onto the storage device 151. The installation module 152 may also load, based on the data set, at least the second optional data package onto storage device 151.

The loading information may be included in an executable file 155. Where an executable file 155 includes the loading information, the installation module 152 extracts the loading information from the executable file 155.

Where the optional data package is a first optional data package among multiple optional data packages, the storage requirement may be a first storage requirement. According to some example embodiments, the installation module 152 identifies the first optional data package by determining that the first storage requirement is greater than a second storage requirement of a second optional data package among the multiple optional data packages. This has the effect of preferring smaller data packages in the selection of optional data packages to be loaded onto the storage device 151. Alternatively, in some example embodiments, the installation module 152 identifies the first optional data package by determining that the first storage requirement is less than the second storage requirement. This has the effect of preferring larger data packages in the selection of optional data packages to be loaded onto the storage device 151.

In some example embodiments, the mandatory data package includes a required software component, the optional data package includes a proposed software component, and the installation module 152 generates the data set indicating at least the required software component as selected for loading onto the storage device 151 and indicating the proposed software component as not selected for loading onto the storage device 151. This has the effect of selecting at least the required software component for loading onto the storage device 151 while not selecting the proposed software component for loading onto the storage device 151.

The installation module 152 may receive a storage value at the memory 156 of the target computer 150. This reception may be via an API call. For example, the installation module 152 may use an API call provided by the operating system of the target computer 150 to receive the storage value. The storage value represents the available storage capacity of the storage device 151.

The installation module 152 may also read a data structure 157 (e.g., FIG. 4, loading information 400) at the target computer 150. The data structure 157 identifies a required software component, a proposed software component, and a storage requirement of the proposed software component. The installation module 152 also determines that the proposed software component is not to be installed onto storage device 151. This determination is based on the storage value and the storage requirement. Furthermore, this determination is performed at the target computer 150. The installation module 153 additionally generates, based on the determination, a data set indicating at least the required software component as selected for installation onto the storage device 151 and not indicating the proposed software component as selected for installation onto the storage device 151. The installation module 152 is may also install, based on the data set, at least the required software component onto the storage device 151.

In some example embodiments, the proposed software component is a first proposed software component among multiple proposed software components. In some of these example embodiments, the installation module 152 generates the data set indicating a second proposed software component as selected for installation onto the storage device 151. The installation module 152 may also install, based on the data set, at least the second proposed software component onto the storage device 151.

The data structure 157 may be included in the executable file 155. Where the executable file 155 includes the data structure 157, the installation module 152 extracts the data structure 157 from the executable file 155.

Where the proposed software component is a first proposed software component among multiple proposed software components, the storage requirement may be a first storage requirement. According to some example embodiments, the installation module 152 identifies the first proposed software component by determining that the first storage requirement is greater than a second storage requirement of a second proposed software component among the multiple optional data packages. This has the effect of preferring smaller software components in the selection of proposed software components to be installed onto the storage device 151. Alternatively, in some of these example embodiments, the installation module 152 identifies the first proposed software component by determining that the first storage requirement is less than the second storage requirement. This has the effect of preferring larger software components in the selection of proposed software components to be installed onto the storage device 151.

Figure 2:
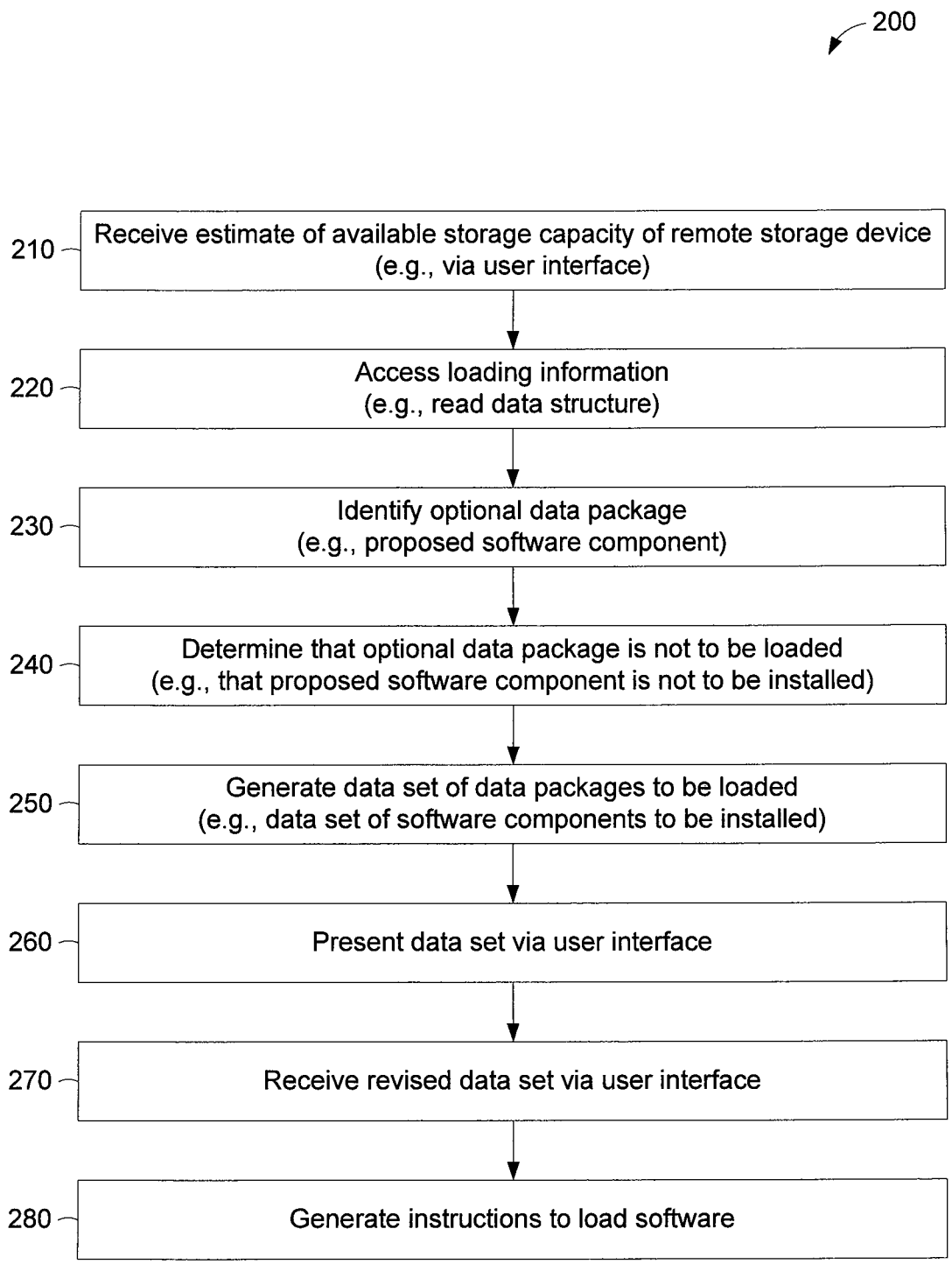
FIG. 2 is a flow chart illustrating operations in a method, according to some example embodiments, to perform software selection based on estimated available storage space.

FIG. 2 is a flow chart illustrating operations in a method 200, according to some example embodiments, to perform software selection based on estimated available storage space. Method 200 includes at least operations 210, 220, 240, 250, and 260.

Operation 210 involves receiving an estimate of the available storage capacity of a storage device (e.g., FIG. 1, storage device 151) at a machine (e.g., FIG. 1, administrator's computer 110). The estimate may be received at an administrator's computer (e.g., FIG. 1, administrator's computer 110). For example, the estimate may be received at an administration module (e.g., FIG. 1, administration module 111) of the administrator's computer. The estimate may be received in the form of an estimated value. For example, the estimate may be received as an estimated value at a memory (e.g., FIG. 1, memory 116) of the administrator's computer. According to some example embodiments, the estimate is received via a user interface (e.g., FIG. 1, user interface 115). For example, the estimate may be received via a data entry field or a graphical user interface (GUI). In certain example embodiments, the estimated value is provided by an administrator (e.g., a user).

Operation 220 involves accessing loading information. The loading information identifies a mandatory data package to be loaded onto the storage device (e.g., FIG. 1, storage device 151), an optional data package, and a storage requirement of the optional data package. The mandatory data package may be a required software component, and the optional data package may be a proposed software component. In some example embodiments, the loading information is accessed at a machine (e.g., FIG. 1, administrator's computer 110). The accessing of the loading information may involve reading a data structure (e.g., FIG. 1, data structure 117, or FIG. 4, loading information 400). For example, operation 220 may involve reading an XML file that identifies a required software component to be installed onto the storage device (e.g., FIG. 1, storage device 151), a proposed software component, and a storage requirement of the proposed software component.

Operation 240 involves determining, based on the estimate of the available storage capacity of the storage device (e.g., FIG. 1, storage device 151) and on the storage requirement, that the optional data package is not to be loaded onto the storage device (e.g., FIG. 1, storage device 151). For example, this determination may be based on the storage requirement being greater than the estimate of the available storage capacity of a storage device (e.g., FIG. 1, storage device 151). As another example, this determination may be based on the storage requirement being greater than a reduced estimate (e.g., an estimated value reduced by a selected value). As a further example, this determination may be based on the storage requirement being within a selected percentage of the estimate (e.g., a selected percentage of an estimated value). According to some example embodiments, operation 240 is performed at the administrator's computer (e.g., FIG. 1, administrator's computer 110). Where the mandatory data package is a required software component, and where the optional data package is a proposed software component, operation 240 includes determining that the proposed software component is not to be installed onto the storage device (e.g., FIG. 1, storage device 151).

Operation 250 involves generating a data set of data packages to be loaded onto the storage device (e.g., FIG. 1, storage device 151). Generation of the data set is based on the determination performed in operation 240. The data set indicates at least the mandatory data package as selected for loading onto the storage device (e.g., FIG. 1, storage device 151) and indicates the optional data package as not selected for loading onto the storage device (e.g., FIG. 1, storage device 151). Where the mandatory data package is a required software component, and where the optional data package is a proposed software component, the data set indicates at least the required software component as selected to be installed onto the storage device (e.g., FIG. 1, storage device 151) and indicates the proposed software component as not selected to be installed onto the storage device (e.g., FIG. 1, storage device 151).

Operation 260 involves presenting the data set via a user interface (e.g., FIG. 1, user interface 115, or FIG. 5, window 500). According to some example embodiments, the data set is presented to an administrator (e.g., a user).

Method 200 may further include operation 280, which involves generating one or more instructions (e.g., a set of instructions) to load at least the mandatory data package onto the storage device (e.g., FIG. 1, storage device 151). In these example embodiments, the generation of the one or more instructions is based on the data set generated in operation 250. Where the mandatory data package is a required software component, and where the optional data package is a proposed software component, operation 280 includes generating, based on the data set, one or more instructions to install at least the required software component onto the storage device (e.g., FIG. 1, storage device 151).

In certain example embodiments, the optional data package is a first optional data package among multiple optional data packages. In some of these example embodiments, operation 250 involves generating the data set such that the data set indicates a second optional data package among the multiple optional data packages as selected for loading onto the storage device (e.g., FIG. 1, storage device 151). This has the effect of selecting the second optional data package for loading onto the storage device while not selecting the first optional data package for loading onto the storage device. Method 200 may further include operation 280, which involves generating, based on the data set, one or more instructions (e.g. a set of instructions) to load at least the second optional data package onto the storage device (e.g. FIG. 1, storage device 151). Where the mandatory data package is a required software component, and where the optional data package is a proposed software component, the second optional data package is a second proposed software component. In these example embodiments, operation 280 includes generating, based on the data set, one or more instructions to install at least the second proposed software component onto the storage device (e.g., FIG. 1, storage device 151).

Where the optional data package is a first optional data package among multiple optional data packages, and where operation 250 involves generating the data set such that the data set indicates a second optional data package as selected for loading onto the storage device (e.g., FIG. 1, storage device 151), method 200 may further include operation 270, which involves receiving, after the presenting of the data set in operation 260, a revised data set via the user interface (e.g., FIG. 1, user interface 115, or FIG. 5, window 500). The revised data set indicates the second optional data package as not selected for loading onto the storage device (e.g., FIG. 1, storage device 151). According to some example embodiments, the generation of one or more instructions in operation 280 is based on the revised data set received in operation 270. Where the mandatory data package is a required software component, and where the optional data package is a proposed software component, operation 280 includes generating, based on the revised data set, one or more instructions to install at least the required software component onto the storage device (e.g., FIG. 1, storage device 151).

Where the optional data package is a first optional data package among multiple optional data packages, the storage requirement may be a first storage requirement. According to some example embodiments, method 200 further includes operation 230, which may involve identifying the first optional data package by determining that the first storage requirement is greater than a second storage requirement of a second optional data package among the multiple optional data packages. This has the effect of preferring smaller data packages in the selection of optional data packages to be loaded onto the storage device (e.g., FIG. 1, storage device 151). Where the mandatory data package is a required software component, and where the optional data package is a proposed software component, operation 230 includes identifying a first proposed software component by determining that its storage requirement is greater than a second storage requirement of a second proposed software component.

Alternatively, operation 230 may involve identifying the first optional data package by determining that the first storage requirement is less than the second storage requirement. This has the effect of preferring larger data packages in the selection of optional data packages to be loaded onto the storage device (e.g., FIG. 1, storage device 151). Where the mandatory data package is a required software component, and where the optional data package is a proposed software component, operation 230 includes identifying a first proposed software component by determining that its storage requirement is less than a second storage requirement of a second proposed software component.

Figure 3:
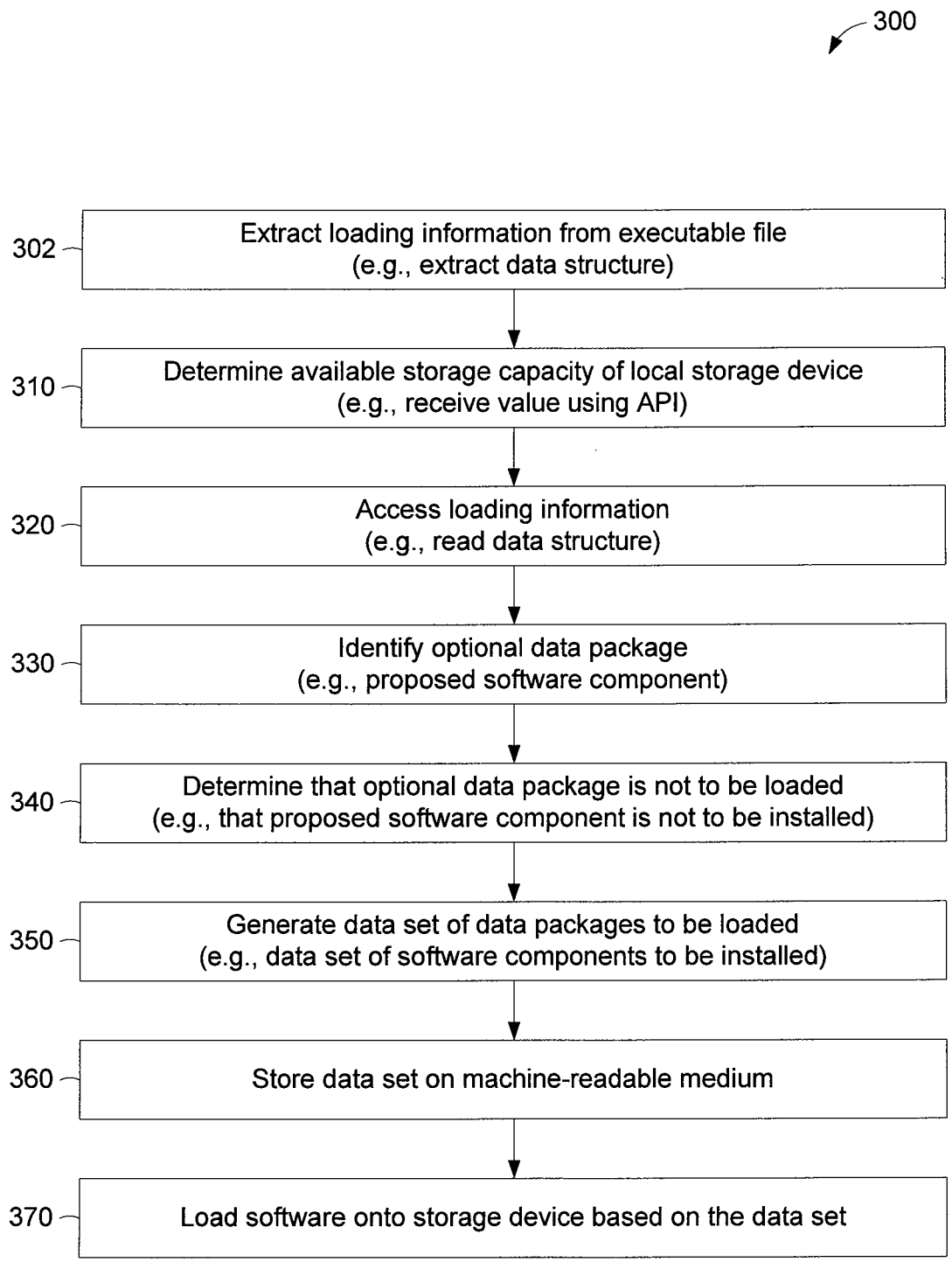
FIG. 3 is a flow chart illustrating operations in a method, according to some example embodiments, to perform software selection based on available storage space.

FIG. 3 is a flow chart illustrating operations in a method 300, according to some example embodiments, to perform software selection based on available storage space. Method 300 includes at least operations 320, 340, 350, and 360.

Operation 320 involves accessing loading information at a machine (e.g., FIG. 1, target computer 150). The loading information identifies a mandatory data package to be loaded onto a storage device (e.g., FIG. 1, storage device 151) of the machine (e.g., FIG. 1, target computer 150), an optional data package, and a storage requirement of the optional data package. The mandatory data package may be a required software component, and the optional data package may be a proposed software component. The accessing of the loading information may involve reading a data structure (e.g., FIG. 1, data structure 157, or FIG. 4, loading information 400). For example, operation 320 may involve reading an XML file that identifies a required software component to be installed onto the storage device (e.g., FIG. 1, storage device 151), a proposed software component, and a storage requirement of the proposed software component.

Operation 340 involves determining based on available storage capacity of the storage device (e.g., FIG. 1, storage device 151) and on the storage requirement, that the optional data package is not to be loaded onto the storage device (e.g., FIG. 1, storage device 151). For example, this determination may be based on the storage requirement being greater than the available storage capacity. As another example, this determination may be based on the storage requirement being greater than the available storage capacity reduced by a value (e.g., reduced by a selected value). As a further example, this determination may be based on the storage requirement being within a selected percentage of the storage value. According to some example embodiments, operation 340 is performed at a target computer (e.g., FIG. 1, target computer 150). Where the mandatory data package is a required software component, and where the optional data package is a proposed software component, operation 340 includes determining that the proposed software component is not to be loaded onto the storage device (e.g., FIG. 1, storage device 151).

Operation 350 involves generating a data set of data packages to be loaded onto the storage device (e.g., FIG. 1, storage device 151). Generation of the data set is based on the determination performed in operation 340. The data set indicates at least the mandatory data package as selected for loading onto the storage device (e.g., FIG. 1, storage device 151) and does not indicate the optional data package as selected for loading onto the storage device (e.g., FIG. 1, storage device 151). Where the mandatory data package is a required software component, and where the optional data package is a proposed software component, the data set indicates at least a required software component as selected to be installed onto the storage device (e.g., FIG. 1, storage device 151) and does not indicate a proposed software component as selected to be installed onto the storage device.

Operation 360 involves storing the data set on a machine-readable medium (e.g., FIG. 1, machine-readable medium 154). As explained in greater detail below, the machine-readable medium may be a memory (e.g., FIG. 1, memory 156) of a machine (e.g., FIG. 1, target computer 150). According to some example embodiments, the data set is stored in a memory (e.g., FIG. 1, memory 156) at the target computer (e.g., FIG. 1, target computer 150).

In some example embodiments, method 300 includes operation 310, which involves determining the available storage capacity of the storage device (e.g., FIG. 1, storage device 151). According to some example embodiments, operation 310 includes receiving a storage value representing the available storage capacity of the storage device (e.g., FIG. 1, storage device 151). The storage value may be received at a memory (e.g., FIG. 1, memory 156) of a machine (e.g., FIG. 1, target computer 150). For example, the storage value may be received, via an API call provided by the operating system of the target computer (e.g., FIG. 1, target computer 150), at a memory (e.g., FIG. 1, memory 156) of the target computer (e.g., FIG. 1, target computer 150).

Method 300 may further include operation 370, which involves loading at least the mandatory data package onto the storage device (e.g., FIG. 1, storage device 151). In these example embodiments, the loading is based on the data set generated in operation 350. Where the mandatory data package is a required software component, and where the optional data package is a proposed software component, operation 370 includes installing, based on the data set, at least the required software component onto the storage device (e.g., FIG. 1, storage device 151).

In certain example embodiments, the optional data package is a first optional data package among multiple optional data packages. In some of these example embodiments, operation 350 involves generating the data set such that the data set indicates a second optional data package among multiple optional data packages as selected for loading onto the storage device (e.g., FIG. 1, storage device 151). This has the effect of selecting the second optional data package for loading onto the storage device while not selecting the first optional data package for loading onto the storage device.

Method 300 may further include operation 370, which involves loading, based on the data set, at least the second optional data package onto the storage device (e.g. FIG. 1, storage device 151). Where the mandatory data package is a required software component, and where the optional data package is a proposed software component, the second optional data package is a second proposed software component. In these example embodiments, operation 370 includes installing, based on the data set, at least the second proposed software component onto the storage device (e.g., FIG. 1, storage device 151).

In various example embodiments, method 300 includes operation 302, which involves extracting the loading information at the target computer (e.g., FIG. 1, target computer 150). The loading information may be extracted from an executable file (e.g., FIG. 1, executable file 155). According to some example embodiments, extracting the loading information involves extracting a data structure (e.g., FIG. 1, data structure 157, or FIG. 4, loading information 400). For example, the loading information may be extracted from a data structure (e.g., FIG. 1, data structure 157, or FIG. 4, loading information 400) contained in an executable file (e.g., FIG. 1, executable file 155).

Where the optional data package is a first optional data package among multiple optional data packages, the storage requirement may be a first storage requirement. According to some example embodiments, method 300 further includes operation 330, which may involve identifying the first optional data package by determining that the first storage requirement is greater than a second storage requirement of a second optional data package among the multiple optional data packages. This has the effect of preferring smaller data packages in the selection of optional data packages to be loaded onto the storage device (e.g., FIG. 1, storage device 151). Where the mandatory data package is a required software component, and where the optional data package is a proposed software component, operation 330 includes identifying a first proposed software component by determining that its storage requirement is greater than a second storage requirement of a second proposed software component.

Alternatively, operation 330 may involve identifying the first optional data package by determining that the first storage requirement is less than the second storage requirement. This has the effect of preferring larger data packages in the selection of optional data packages to be loaded onto the storage device (e.g., FIG. 1, storage device 151). Where the mandatory data package is a required software component, and where the optional data package is a proposed software component, operation 330 includes identifying a first proposed software component by determining that its storage requirement is less than a second storage requirement of a second proposed software component.

Figure 4:
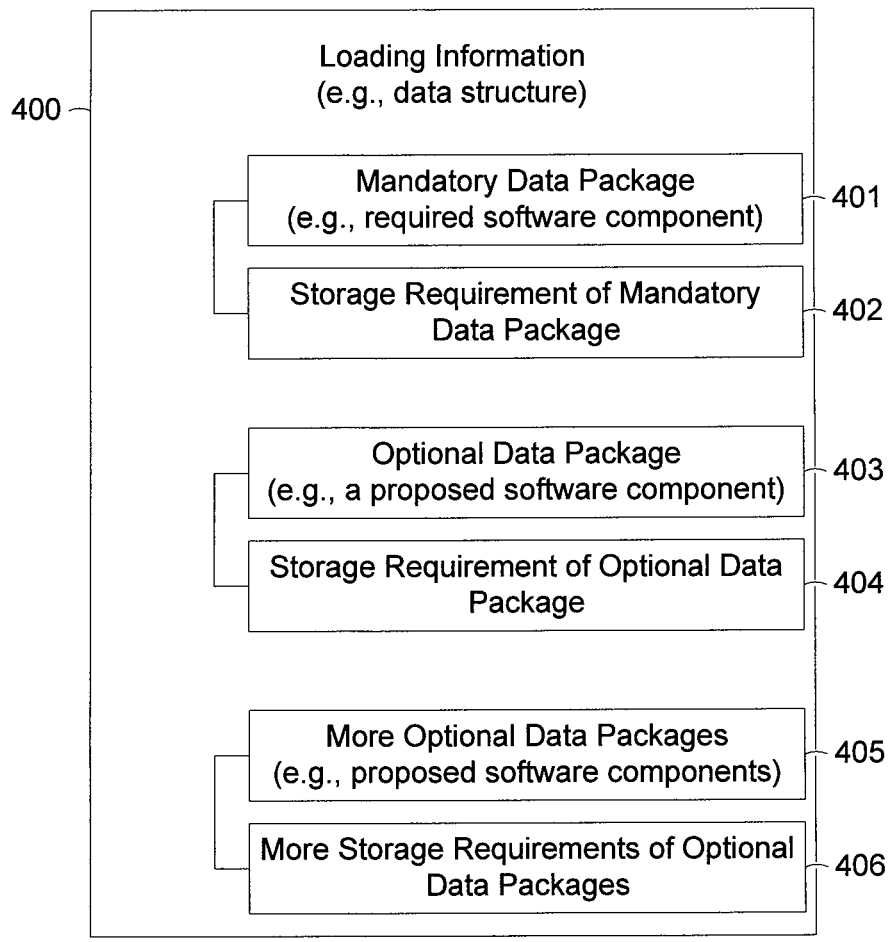
FIG. 4 is a block diagram illustrating a data structure, according to some example embodiments, to facilitate software selection based on available storage space.

FIG. 4 is a block diagram illustrating a data structure, according to some example embodiments, to facilitate software selection based on available storage space. The loading information 400 identifies at least a mandatory data package 401, an optional data package 403, and a storage requirement 404 of the optional data package 403. The loading information 400 may further identify a storage requirement 402 of the mandatory data package 401. According to various example embodiments, the loading information 400 further identifies more optional data packages 405 and more storage requirements 406 of the more optional data packages 405. The loading information 400 may be stored in a data structure (e.g., FIG. 1, data structure 157). For example, the loading information 400 may be stored in a record of the database. As another example, the loading information 400 may be stored in a file within a file system (e.g., an XML file). In some example embodiments, the loading information 400 is stored in an executable file (e.g., FIG. 1, executable file 155). The mandatory data package 401 may be a required software component, and the optional data package 403 may be a proposed software component. In some example embodiments, the more optional data packages 405 include more proposed software components.

FIG. 5 is a diagram illustrating a user interface (e.g., FIG. 1, user interface 115), according to some example embodiments, to facilitate software selection based on estimated available storage space. Window 500 is a GUI. The window 500 includes a presentation 510, a graphical data entry tool 520, and alphanumeric data entry tool 521, and an action initiator 530.

The presentation 510 presents a data set of data packages (e.g., software components) to be loaded or installed onto a storage device (e.g., FIG. 1, storage device 151) of a target computer (e.g., FIG. 1, target computer 150). The presentation 510 presents a mandatory data package 511 ("YakSoft Core Engine," a required software component), optional data packages 512 and 513 ("YakSoft Additional Fonts" and "YakSoft Advanced Scripting Tools," both being proposed software components), and a storage requirement 514 ("133.1 MB") of an optional data package 512 ("YakSoft Additional Fonts"). As shown in the example, selection indicators 515 and 516 indicate that one optional data package 512 ("YakSoft Additional Fonts") is selected for loading onto the storage device (e.g., FIG. 1, storage device 151) and that another optional data package 513 ("YakSoft Advanced Scripting Tools") is not selected for loading onto the storage device (e.g., FIG. 1, storage device 151. The selection indicators 515 and 516 are checkboxes that may each be checked or unchecked to respectively indicate selection or non-selection of a data package (e.g., a software component). For example, an administrator (e.g., a user) may use a pointing instrument (e.g., a computer mouse) to check or uncheck one or more selection indicators (e.g., selection indicators 515 and 516).

The graphical data entry tool 520 is a slider bar operable to enter an estimated value representing an estimate (e.g., an estimated value) of the available storage capacity of the storage device (e.g., FIG. 1, storage device 151) of the target computer (e.g., FIG. 1, target computer 150). For example, an administrator (e.g., a user) may use a pointing instrument (e.g., a computer mouse) to enter the estimated value using the graphical data entry tool 520.

The alphanumeric data entry tool 521 is a text entry field operable to enter the estimate (e.g., an estimated value). For example, an administrator (e.g., a user) may use a keyboard to enter an estimated value in the alphanumeric data entry tool 521. A graphical data entry tool 520 and the alphanumeric data entry tool 521 may be coupled in a manner that propagates one or more values from one to the other.

The action initiator 530 is a graphical button operable to initiate the storage of the information shown in window 500 for subsequent revision, confirmation, submission, action, or any combination thereof. For example, responsive to a mouse click on the action initiator 530, the user interface (e.g., FIG. 1, user interface 115) may display a subsequent window allowing an administrator (e.g., a user) to confirm or cancel selections shown in presentation 510, non-selections shown in presentation 510, an estimated value entered via the graphical data entry tool 520, an estimated value entered via the alphanumeric data entry tool 521, or any combination thereof.

The window 500, in some example embodiments, contains a graphical selector operable to request that the available storage capacity of the storage device (e.g., FIG. 1, storage device 151) be automatically accessed, determined, received, or any combination thereof, at the target computer (e.g., FIG. 1, target computer 150). For example, the window 500 may contain a toggle button that allows an administrator (e.g., a user) to specify that one or more operations of a particular example embodiment of method 300 are to be performed at the target computer (e.g., FIG. 1, target computer 150). This may have the effect of causing an installation configuration module (e.g., FIG. 1, installation configuration module 112) at an administrator's computer (e.g., FIG. 1, administrator's computer 110) to generate an executable file (e.g., FIG. 1, executable file 155) that, when executed on the target computer (e.g., FIG. 1, target computer 150) executes one or more operations of the method 300.

Figure 6:
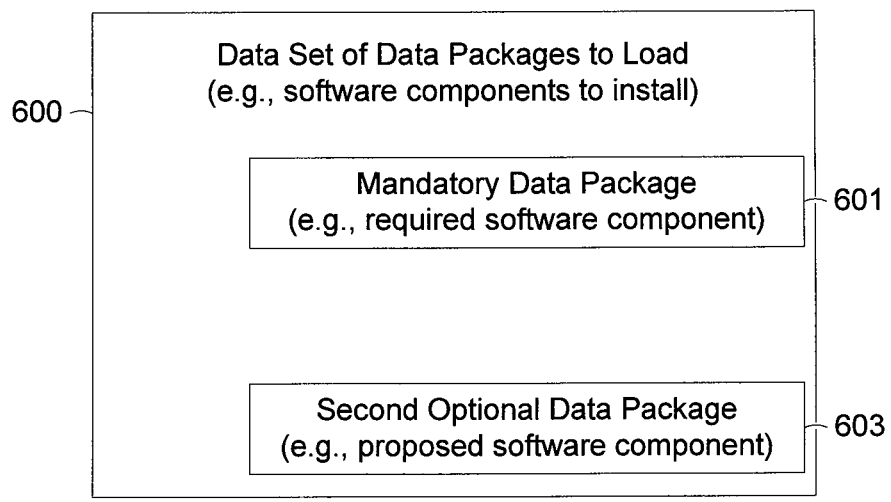
FIG. 6 is a block diagram illustrating a data set, according to some example embodiments, involved in loading or installing software selected based on estimated available storage space.

FIG. 6 is a block diagram illustrating a data set, according to some example embodiments, involved in loading software selected based on available storage space. The data set 600 identifies one or more data packages to be loaded onto a storage device (e.g., FIG. 1, storage device 151) of a target computer (e.g., FIG. 1, target computer 150). The data set 600 may be a data set of software components to be installed onto the storage device (e.g., FIG. 1, storage device 151). The data set 600 includes at least a mandatory data package 601, which in some example embodiments may be a required software component. The data set 600 does not identify a first optional data package among multiple optional data packages, but the data set 600 does identify a second optional data package 603 among the multiple optional data packages. In some example embodiments, the second optional data package 603 may be a proposed software component.

Figure 7:
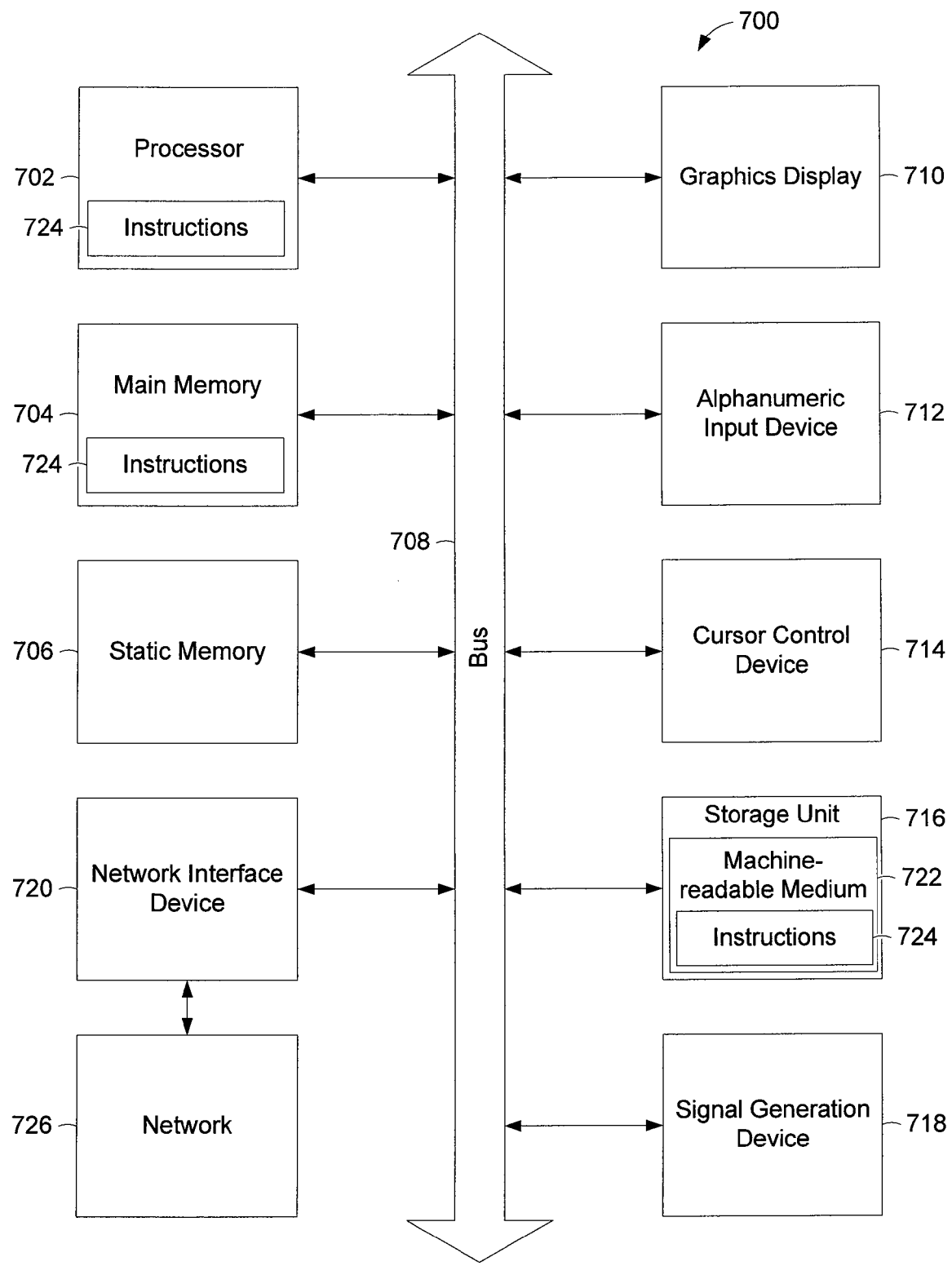
FIG. 7 is a block diagram illustrating components of an example machine able to read instructions from a machine-readable medium.

FIG. 7 illustrates components of an example machine able to read instructions from a machine-readable medium. Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a server computer, a client computer, a PC, a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include a collection of machines that individually or jointly execute instructions 424 to perform any one or more of the methodologies discussed herein.

Computer system 700 includes processor 702 (e.g., a central processing unit (CPU), a graphics processing unit (GPU), a digital signal processor (DSP), application specific integrated circuits (ASICs), radio-frequency integrated circuits (RFICs), or any combination of these), main memory 704, and static memory 706, which communicate with each other via bus 708. Computer system 700 may further include graphics display unit 710 (e.g., a plasma display panel (PDP), a liquid crystal display (LCD), a projector, or a cathode ray tube (CRT)). Computer system 700 may also include alphanumeric input device 712 (e.g., a keyboard), cursor control device 714 (e.g., a mouse, a trackball, a joystick, a motion sensor, or other pointing instrument), storage unit 716, signal generation device 718 (e.g., a speaker), and network interface device 720.

Storage unit 716 includes a machine-readable medium 722 on which is stored instructions 724 (e.g., software) embodying any one or more of the methodologies or functions described herein. Instructions 724 (e.g., software) may also reside, completely or at least partially, within main memory 704 and/or within processor 702 (e.g., within a processor's cache memory) during execution thereof by computer system 700, main memory 704 and processor 702 also constituting machine-readable media. Instructions 424 (e.g., software) may be transmitted or received over network 726 via network interface device 720.

As used herein, the term "memory" refers to a machine-readable medium able to store data temporarily or permanently and may be taken to include, but not be limited to, random-access memory, read-only memory, buffer memory, flash memory, and cache memory. While machine-readable medium 722 is shown in an example embodiment to be a single medium, the term "machine-readable medium" should be taken to include a single medium or multiple media (e.g., a centralized or distributed database, and/or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies of the present invention. The term "machine-readable medium" shall accordingly be taken to include, but not be limited to, data repositories in the form of solid-state memories, optical media, and magnetic media.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive or, unless specifically stated otherwise.

What is claimed is:

1. A method comprising:
accessing loading information that identifies a mandatory data package to be loaded onto a storage device of a machine, a first optional data package, and a first storage requirement of the first optional data package, the accessing of the loading information being performed by a configuration module;
comparing the first storage requirement of the first optional data package to a second storage requirement of a second optional data package, the comparing of the first storage requirement to the second storage requirement being performed to select the first optional data package as a potential data package by the configuration module for loading;
determining that the potential data package is not to be loaded onto the storage device, the determining being performed by the configuration module based on comparing only an available storage capacity of the storage device of the machine and the first optional data package being selected by the configuration module as the potential data package;
generating a data set that indicates at least, the mandatory data package is selected for loading onto the storage device and that does not indicate the first optional package is selected for loading onto the storage device, the data set being usable to generate instructions to load at least the mandatory data package without the first optional data package onto the storage device, the generating of the data set being performed by the configuration module based on the determining that the potential data package is not to be loaded onto the storage device; and
storing the data set on a machine-readable medium, the storing of the data set being caused by a storage module.

2. The method of claim 1 further comprising:
determining the available storage capacity of the storage device.

3. The method of claim 1 further comprising:
loading, based on the data set, at least the mandatory data package without the potential data package onto the storage device.

4. The method of claim 1 further comprising:
loading, based on the data set, at least the mandatory data package and the second optional data package without the potential data package onto the storage device.

5. The method of claim 1 further comprising:
extracting the loading information included in an executable file.

6. The method of claim 1, wherein the identifying of the first optional data package as the potential data package includes determining that the first storage requirement is greater than the second storage requirement of the second optional data package.

7. The method of claim 1, wherein the identifying of the first optional data package as the potential data package includes determining that the first storage requirement is less than the second storage requirement of the second optional data package.

8. The method of claim 1, wherein the mandatory data package is a required software component, wherein the first optional data package is a first proposed software component, and wherein the generating of the data set generates the data set indicating at least the required software component as selected to be loaded onto the storage device and not indicating the first proposed software component as selected for loading onto the storage device.

9. An apparatus comprising:
a hardware-implemented installation module configured to:
access loading information that identifies a mandatory data package to be loaded onto a storage device of a machine, a first optional data package, and a first storage requirement of the first optional data package;
compare the first storage requirement of the first optional data package to a second storage requirement of a second optional data package, the comparing of the first storage requirement to the second storage requirement being performed to select the first optional data package as a potential data package for loading;

determine that the potential data package is not to be loaded onto the storage device, the determining being based on comparing only an available storage capacity of the storage device of the machine and the first optional data package being selected as the potential data package;

generate a data set that indicates at least the mandatory data package is selected for loading onto the storage device and that does not indicate the first optional package is selected for loading onto the storage device, the data set being usable to generate instructions to load at least the mandatory data package without the first optional data package onto the storage device, the generating being based on the determination that the potential data package is not to be loaded onto the storage device; and a hardware-implemented storage module configured to store the data set on a machine-readable medium.

10. The apparatus of claim 9, wherein the installation module is further configured to: determine the available storage capacity of the storage device.

11. The apparatus of claim 9, wherein the installation module is further configured to: generate, based on the data set, one or more instructions to load at least the mandatory data package onto the storage device.

12. The apparatus of claim 9, wherein the installation module is further configured to: load, based on the data set, at least the mandatory data package and the second optional data package without the potential data package onto the storage device.

13. The apparatus of claim 9, wherein the installation module is further configured to: extract the loading information included in an executable file.

14. The apparatus of claim 9, wherein the installation module is further configured to: identify the first optional data package as the potential data package by determining that the first storage requirement is greater than the second storage requirement of the second optional data package.

15. The apparatus of claim 9, wherein the installation module is further configured to: identify the first optional data package by determining that the first storage requirement is less than the second storage requirement of the second optional data package.

16. The apparatus of claim 9, wherein the mandatory data package is a required software component, wherein the first optional data package is a first proposed software component, and wherein the installation module is further configured to: generate the data set indicating at least the required software component as selected for loading onto the storage device and not indicating the first proposed software component as selected for loading onto the storage device.

17. A system comprising:
means for:
accessing loading information that identifies a mandatory data package to be loaded onto a storage device, a first optional data package, and a first storage requirement of the first optional data package;
comparing the first storage requirement of the first optional data package to a second storage requirement of a second optional data package, the comparing of the first storage requirement to the second storage requirement being performed to select the first optional data package as a potential data package for loading;
determining that the potential data package is not to be loaded onto the storage device, the determining being based on comparing only an available storage capacity of the storage device and the first optional data package being selected as the potential data package; and
generating a data set that indicates at least the mandatory data package is selected for loading onto the storage device and that does not indicate the first optional data package is selected for loading onto the storage device, the data set being usable to generate instructions to load at least the mandatory data package without the first optional data package onto the storage device, the generating being based on the determining that the potential data package is not to be loaded onto the storage device; and
means for storing the data set on a machine-readable medium.

18. A non-transitory machine-readable storage medium comprising a set of instructions that, when executed by one or more processors of a machine, cause the machine to perform operations comprising:
accessing loading information that identifies a mandatory data package to be loaded onto a storage device, a first optional data package, and a first storage requirement of the first optional data package;
comparing the first storage requirement of the first optional data package to a second storage requirement of a second optional data package, the comparing of the first storage requirement to the second storage requirement being performed to identify the first optional data package as a potential data package for loading;
determining that the potential data package is not to be loaded onto the storage device, the determining being based on comparing only an available storage capacity of the storage device of the machine and the first optional data package being selected as the potential data package;
generating a data set that indicates at least the mandatory data package is selected for loading onto the storage device and that does not indicate the first optional data package is selected for loading onto the storage device, the data set being usable to generate instructions to load at least the mandatory data package without the first optional data package onto the storage device, the generating being based on the determining that the potential data package is not to be loaded onto the storage device; and
storing the data set.

19. A method comprising:
receiving, via an application programming interface, a storage value at a memory, the storage value representing an available storage capacity of a storage device of a machine;
reading a data structure that identifies a required software component to be installed onto the storage device of the machine, a first proposed software component, and a first storage requirement of the first proposed software component;
comparing the first storage requirement of the first proposed software component to a second storage requirement of a second proposed software component, the comparing of the first storage requirement to the second storage requirement being performed to select the first proposed software component as a potential software component for loading;
determining that the potential software component is not to be loaded onto the storage device, the determining being based on comparing only the storage value and the first proposed software component selected as a potential software component;

generating a data set that indicates at least the required software component is selected for loading onto the storage device and that does not indicate the first proposed software component is selected for loading onto the storage device, the data set being usable to generate instructions to load at least the required software component without the first proposed software component onto the storage device, the generating being based on the determining that the potential software component is not to be installed onto the storage device; and storing the data set on a machine-readable medium.

20. The method of claim 19 further comprising: installing, based on the data set, at least the required software component onto the storage device.

21. The method of claim 19, wherein further comprising:
installing, based on the data set, at least the required software component and the second proposed software component without die potential software component onto the storage device.

22. The method of claim 19 further comprising: extracting the data structure included in an executable file.

23. The method of claim 19, wherein the identifying of the first proposed software component as the potential software component includes determining that the first storage requirement is greater than the second storage requirement of the second proposed software component.

24. The method of claim 19, wherein the identifying of the first proposed software component as the potential software component includes determining that the first storage requirement is less than the second storage requirement of the second proposed software component.

* * * * *